United States Patent [19]

Hendry et al.

[11] Patent Number: 5,151,728
[45] Date of Patent: Sep. 29, 1992

[54] 6-BAR ERECTING SYSTEM

[75] Inventors: Donald H. Hendry, Rockland; Bruce K. Johnson, Andover; Joanne M. Krawczyk, Dracut; Bruce C. Vierstra, Rockport, all of Mass.

[73] Assignee: Polaroid Corporation, Cambridge, Mass.

[21] Appl. No.: 739,320

[22] Filed: Aug. 1, 1991

[51] Int. Cl.⁵ ............................................. G03B 17/50
[52] U.S. Cl. .................................. 354/83; 149.11/187
[58] Field of Search ............... 354/126, 158, 187, 193, 354/194, 149.11, 83, 86

[56] References Cited

U.S. PATENT DOCUMENTS

4,389,110  6/1983  Pizzuti ........................... 354/187 X

*Primary Examiner*—Russell E. Adams
*Assistant Examiner*—Howard B. Blankenship
*Attorney, Agent, or Firm*—John J. Kelleher

[57] ABSTRACT

A compact folding camera having a plurality of housing members which are mounted for movement between folded and erect positions includes a six-bar, revolute joint, erecting system for coordinating movement of these movable housing members between their folded and erect positions.

12 Claims, 8 Drawing Sheets

6-BAR ERECTING SYSTEM

BACKGROUND OF THE INVENTION

1. Field of the Invention

This invention relates to photographic cameras of the folding type, in general, and to such cameras having a plurality of housing members which are mounted for movement between an erect operative position and a compact or folded inoperative position, in particular.

2. Description of the Prior Art

Compact folding cameras employing a folded optical path between an objective lens and an exposure plane are well known in the photographic art. These cameras normally occupy less volume in both their folded and erect configurations than a traditional straight line, optical path, folding camera. A compact folding camera of this general type is disclosed in commonly assigned U.S. Pat. No. 4,389,110 to Pizzuti. The camera includes a horizontal base section having a film plane therein, a pivotable lens housing near one end of the film plane, a mirror assembly pivotably mounted adjacent the opposite end of the film plane, a foldable bellows and a cover section. The cover section is pivotally coupled to one end of the base section near the mirror connection and is interconnected with the lens housing for coordinated movement by an erecting link. The lens housing and mirror assembly are interconnected for coordinated movement by a linkage system. When the camera is erected, the cover section is angularly displaced with respect to the base section so that the lens housing, mirror assembly and bellows may assume their erected and operative positions over the base section in readiness to effect exposure of a film unit at the film plane. In response to closing the cover section, the mirror assembly, bellows and lens housing fold down onto the base section wherein they assume a stacked relationship over the film plane and are protectably covered by the overlying cover section.

While the above-described camera design has achieved a considerable degree of compactness, there is a present need for a bellows-type folding camera of even greater compactness that is also capable of being rapidly erected and folded, without one housing member interfering with the movement of another housing member and/or without stretching the bellows portion thereof, during such camera housing member movement. The interference of one housing member by another and the bellows stretching during rapid housing member movement in such cameras is due, in part, to the use of a two-degree of freedom erection system for rotatably and translatably coupling one movable housing member to another.

SUMMARY OF THE INVENTION

In accordance with the present invention a compact, folding camera having a plurality of housing members which are mounted for movement between a folded or inoperative position and an erected or operative position wherein image-bearing light rays are directed toward photosensitive material, supported within one of the housing members for image-forming purposes, is provided with a six-bar, revolute joint, erecting system for coordinating movement of said housing members between their said folded and erected positions. The camera includes a light-excluding, collapsible bellows surrounding an exposure optical path which is supported by certain housing members. The erection system coordinates such housing member movement in a manner which precludes both the stretching of the bellows and the interference of one housing member by another housing member during such housing member movement, and occupies minimal storage space within the camera when in its fully folded position.

It is a primary object of the present invention, therefore, to provide an erection system for a bellows-type, compact folding camera which will preclude the stretching of the bellows and/or the interference of one movable housing member by another movable housing member when the camera is moved between its erect and folded positions.

It is another primary object of the present invention to provide an erection system for a compact folding camera which will enable the camera to be folded into a smaller spacial envelope from an unfolded or erect position than was heretofore possible.

Other objects, features and/or advantages of the present invention will be readily apparent from the following detailed description of a preferred embodiment thereof when taken in conjunction with the accompanying drawings.

DETAILED DESCRIPTION OF THE PREFERRED EMBODIMENT

Figure 1:
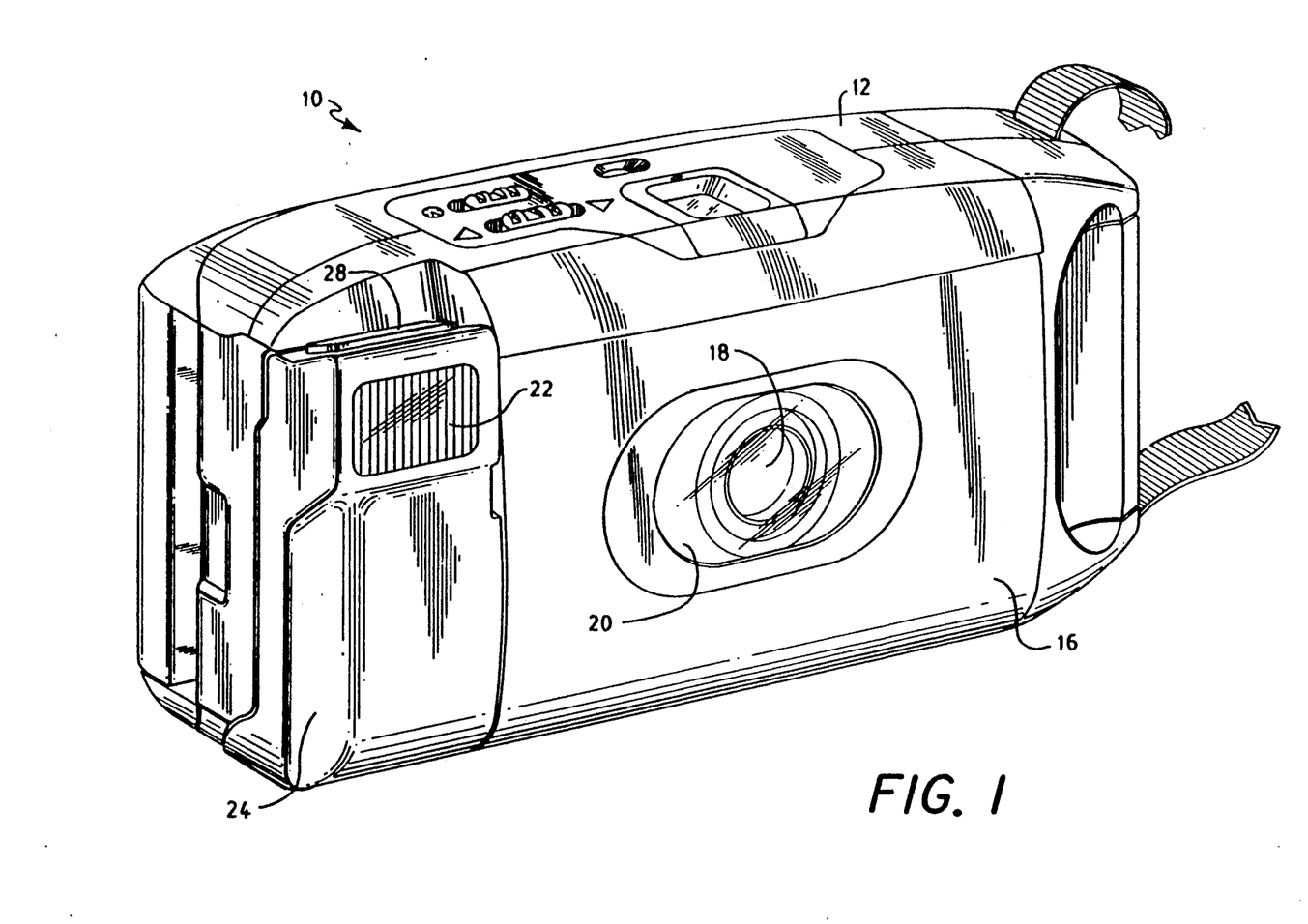
FIG. 1 is a right front perspective view of the compact, bellows-type, folding camera of the present invention shown in its folded and latched condition.
Figure 2:
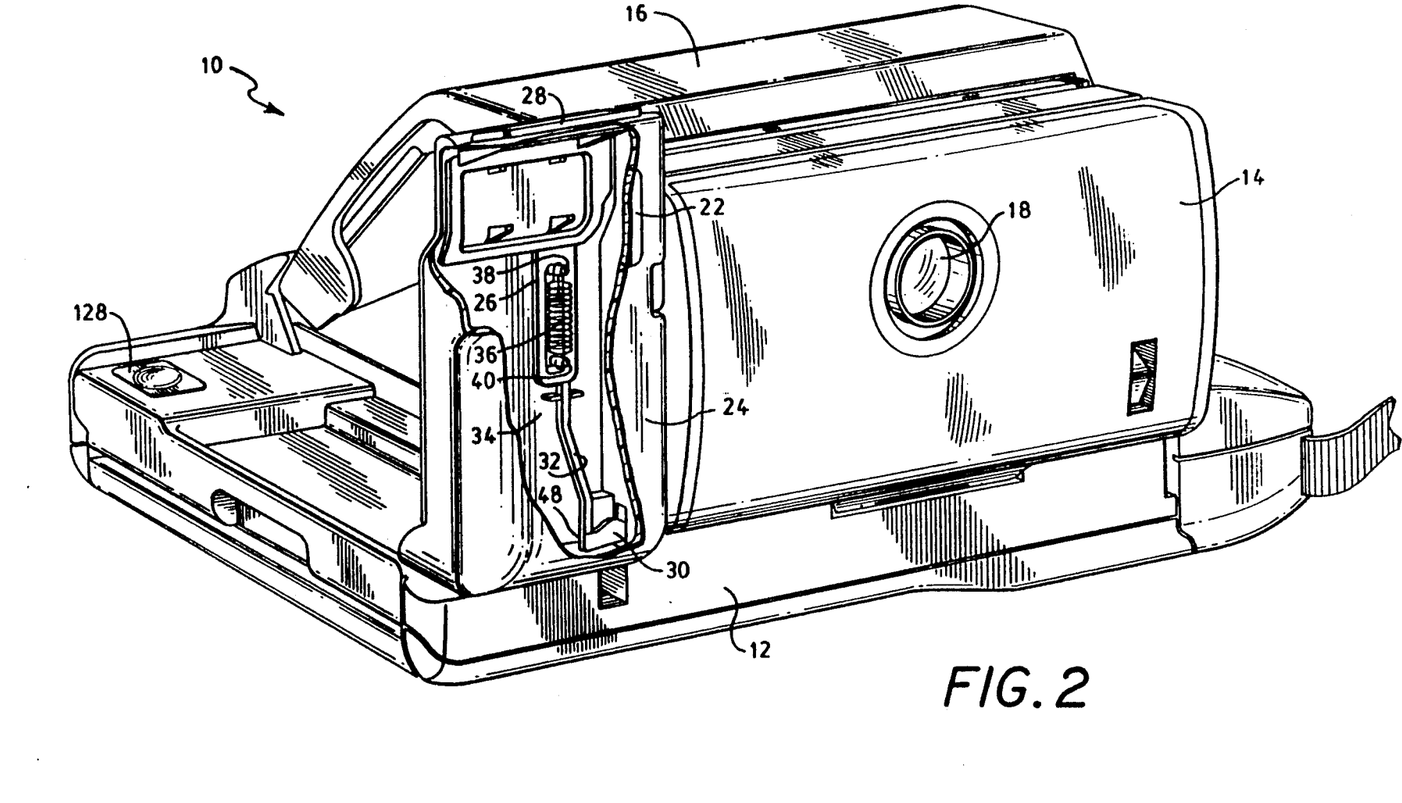
FIG. 2 is a right front perspective view of the camera shown in its erected operative condition with a portion thereof broken away to shown the cover latch mechanisms thereof.

Referring now to the drawings, and specifically to FIGS. 1 and 2, there is shown a compact, bellows-type, folding camera, of the self-developing type, which incorporates a preferred embodiment of the six-bar, camera-component erecting system of the present invention. Major components of the camera 10 are manually movable between an inoperative folded or storage condition as shown in FIG. 1 and an erect operative condition as shown in FIG. 2.

The camera 10 includes a base housing section 12 for enclosing such camera components as a film cassette, a film transport system and an exposed film unit storage chamber, each of which will be described in various levels of detail below. The camera 10 further includes a shutter housing 14 and a cover member 16 which are pivotally attached to the base housing section 12, at opposite sides thereof. An objective or taking lens 18 of the adjustable focus type for focusing scene images at a film plane of the camera 10 and a conventional exposure interval generating shutter mechanism of the scanning blade type located in the optical path of the lens 18, are mounted within the shutter housing 14. The cover member 16 provides a protective covering for the camera 10 when it is placed in its fully folded position as shown, for example, in FIG. 1. The cover 16 includes a transparent window 20 through which the objective lens 18 may be viewed.

The camera 10 also includes an electronic flash unit for illuminating a scene to be photographed with artificial light. The electronic flash unit includes an electronic flash tube 22 mounted within a flash tube housing 24. The flash tube housing 24 is in a fixed position with respect to the shutter housing 14 and rotates about the same axis of rotation as said shutter housing 14. It should be noted that the flash housing 24 and the shutter housing 14 may be formed as a single housing unit. The shutter housing 14 is moved between its erect and folded positions by the manual movement of the flash tube housing 24 between its erect and folded positions, by a camera operator.

Figure 3:
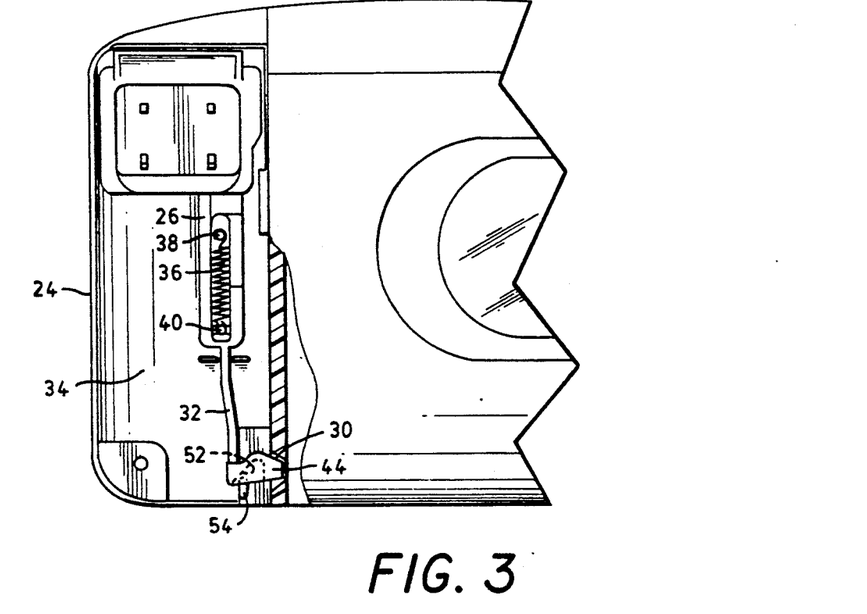
FIG. 3 is the flash housing end of the camera in its folded condition shown partly broken away to reveal the cover latch mechanism therefor in its latched position.
Figure 4:
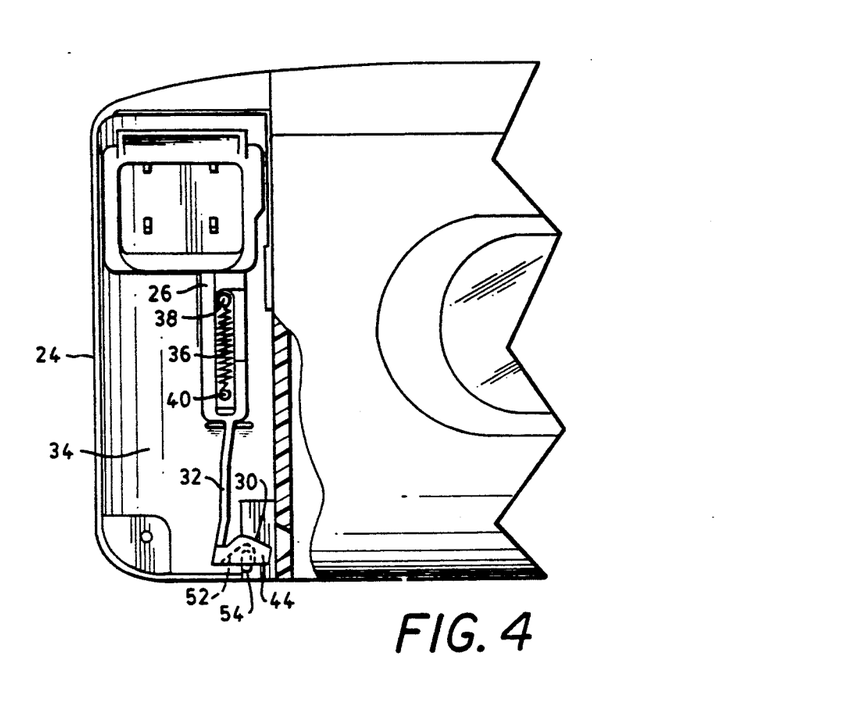
FIG. 4 is the flash housing end of the camera in its folded condition shown partly broken away to reveal the cover latch mechanism therefor in its unlatched position.

The camera 10 is maintained in its fully collapsed or folded position, as shown in FIG. 1, by a cover 16 latching device included within the flash tube housing 24. This latching device is best illustrated in FIGS. 3 and 4 which shown the flash tube housing 24 end of the camera 10 with the cover 16 in its fully closed position. Portions of the housing 24 have been cut away to show the cover 16 in its latched condition in FIG. 3 and in its unlatched condition in FIG. 4.

With additional reference to FIGS. 3 and 4, the latch for the cover 16 includes a rod 26 for transmitting a camera operator generated, cover 16 unlatching force between a cover release button 28 projecting from a free end of the flash tube housing 24, and a free end of the rod 26 in the form of a cover-latching finger 30. The release button 28 is mechanically coupled to one end of the rod 26. The rod 26 incorporates a relatively thin, laterally flexible strut portion 32, intermediate the ends thereof. The rod 26 is slidably mounted on an inside wall 34 of the flash tube housing 24. A coil spring 36, having one end attached to a pin 38 projecting from the wall 34 and another end attached to a pin 40 projecting from the rod 26, spring force biases the rod 26 and the cover release button 28 attached thereto towards the free end of the flash tube housing 24.

Figure 5:
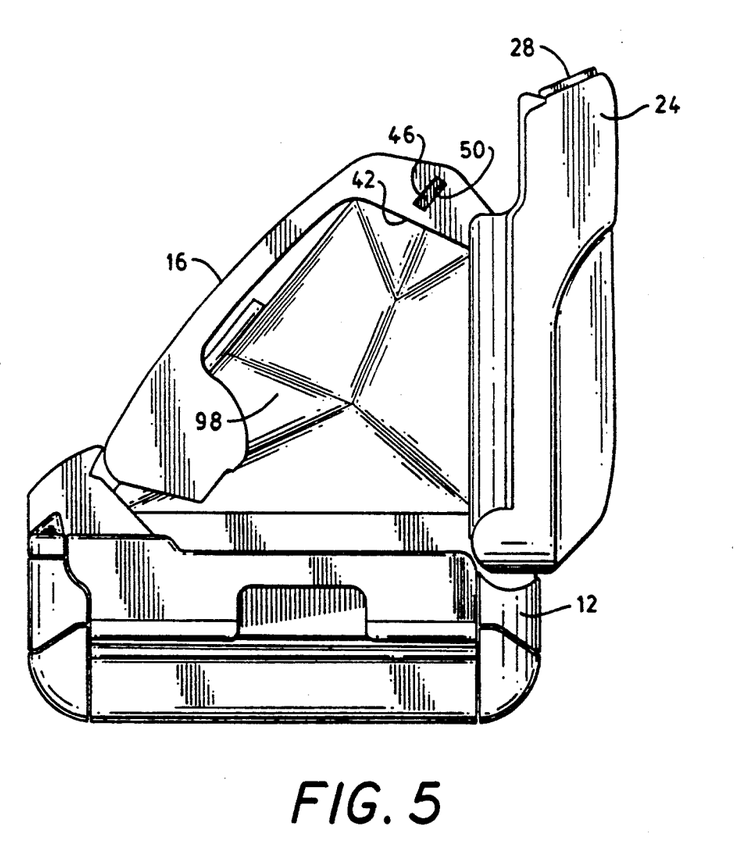
FIG. 5 is a right side elevational view of the camera as shown in FIG. 2.

Referring additionally to FIG. 5, when the cover 16 is manually closed, an edge portion 42 thereof engages a cam surface 44 of the finger 30 and laterally displaces or bends the strut 32 and thereby moves the finger portion 30 of the rod 26 out of the path of the cover 16. When the cover 16 is in its fully closed position, the finger 30 springs into an opening 46 (FIG. 5) in the side of the cover 16 causing a surface 48 (FIG. 2) of the finger 30 to engage a surface 50 of the opening 46 and thereby latch or maintain the cover 16 in its fully closed position.

The cover 16 of the camera 10 is unlatched when a camera operator depresses the cover release button 28. When the cover release button 28 is depressed, a cam surface 52, formed within the finger portion 30 of the rod 26, is moved into engagement with a cam 54 projecting from the inner rear wall 34 of the flash tube housing 24. The cam 54 moves across the cam surface 52 as the rod 26 is further depressed to produce a camming action which bends the strut 32 of the rod 26 causing the finger portion 30 thereof to be withdrawn from the opening 46 in the side of the cover 16 and thereby unlatch the cover 16 so that the camera 10 can be placed in its erect operative condition by a camera operator.

Figure 6:
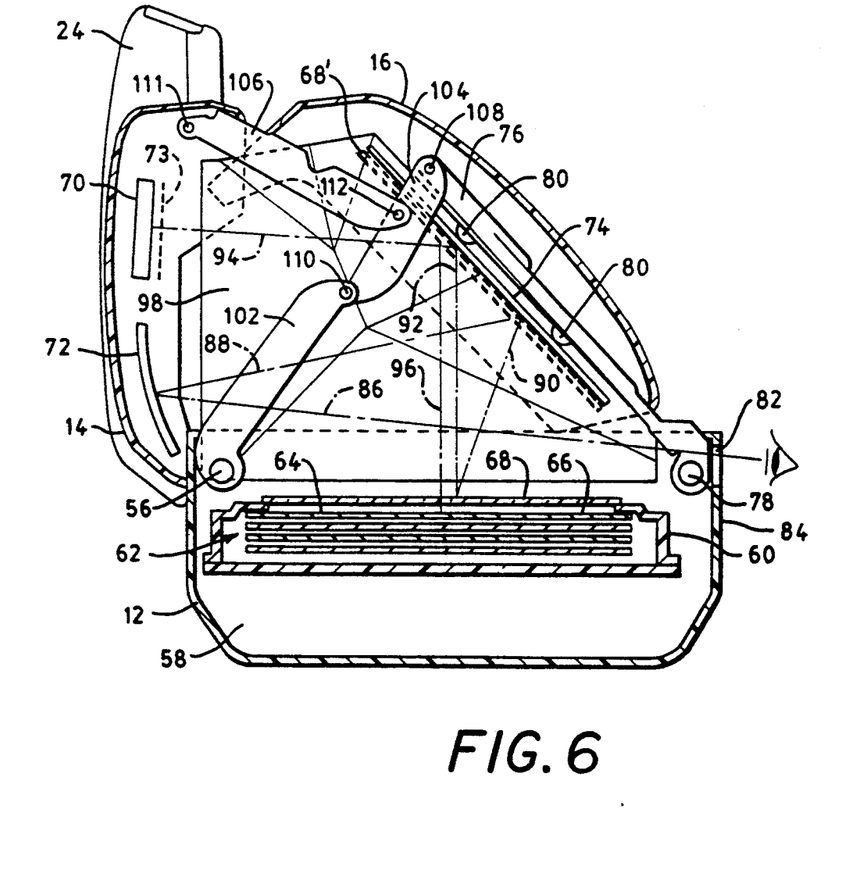
FIG. 6 is a left side elevational view of the camera as shown in FIG. 2, partly in section, showing various components thereof in their erected operative positions.
Figure 7:
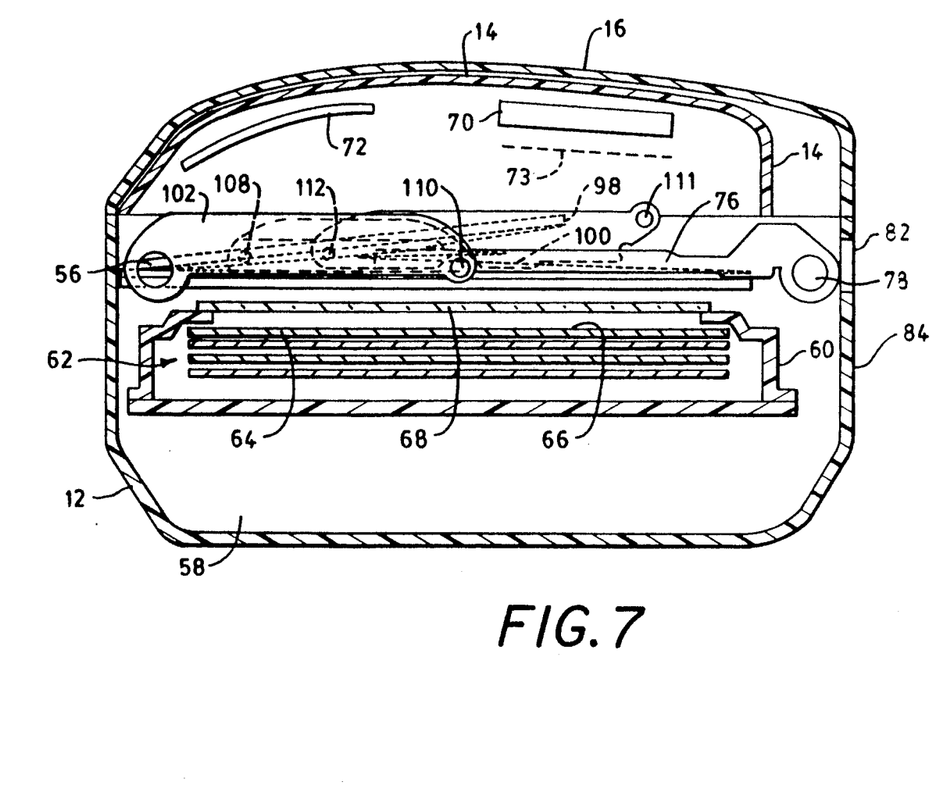
FIG. 7 is a left side elevational view of the camera as shown in FIG. 1, partly in section, showing various components thereof in their folded, inoperative positions.

The shutter housing 14, as previously noted, is pivotally attached to the base housing section 12. As best shown in FIGS. 6 and 7, which are left side elevational views, partly in section, of the camera 10 in its erect and folded positions, respectively, the shutter housing 14 is rotatably attached to the base housing section 12 at a revolute (rotation only) pivot joint 56. The base housing section 12 includes means for defining an open ended chamber 58 therein for receiving and supporting a film cassette 60 which encloses a plurality of self-developing film units 62 so that a forwardmost one 64 thereof is located at a film plane 66 of the folding camera 10. A pivotally mounted, light-blocking taking mirror 68, having reflective surfaces on both sides, overlies the film unit 64. The mirror is pivotable between a viewing position shown in solid lines designated 68 and a taking position shown in phantom and designated 68', in FIG. 6. In its viewing position the taking mirror 68 overlies the film unit 64 and the cassette 60 such that while in this position light is precluded form reaching the film unit 64.

An adjustable focus objective or taking lens 70 and a curved reflecting mirror 72 are mounted within the shutter housing 14. In addition, an electronically controlled shutter mechanism 73 for automatically regulating the transmission of image-bearing light rays through the objective lens 70 to the film plane 66 is located within the shutter housing 14, immediately behind the lens 70. An example of a shutter mechanism of this type is described in U.S. Pat. No. 3,942,183 to Whiteside. An example of an exposure control system incorporating such a shutter mechanism is described in U.S. Pat. No. 4,894,678 to Farrington et al.

The camera 10 also includes a mirror assembly for pivotally supporting a viewing mirror 74. The mirror assembly includes a plate-like mirror carrier 76 which is rotatably attached to the base housing section 12 at a revolute pivot joint 78. The viewing mirror 74 is attached in a fixed position to the mirror carrier 76 by a set of bosses 80 projecting from a surface thereof. The mirror carrier 76 and the viewing mirror 74 mounted thereon are rotatable between an erect or viewing position as shown in FIG. 6 and a folded or storage position as shown in FIG. 7.

A viewfinder lens 82 is mounted in a rear wall 84 of the base housing section 12 for viewing a scene to be photographed through the taking lens 70 when the camera 10 is in its erect position as shown in FIG. 6. Prior to the exposure of the photographic film unit 64, the shutter mechanism 73 is in its fully open position. An image of a scene to be photographed is viewable through the viewfinder lens 82 and the taking lens 70 along an optical path comprising a combination of the paths 86, 88, 90, 92 and 94. During an exposure interval when the shutter mechanism 73 regulates image-bearing light rays transmitted through the taking lens 70, the taking mirror 68 has been rotated to its taking position 68' and the light rays are transmitted to the film plane 66 and the film unit 64 present thereat, along the paths 94 and 96.

The camera 10 additionally includes a folding light-opaque bellows 98. The bellows 98 has two distinct functional aspects. The first relates to the photographic process wherein the erected bellows 98, best shown in FIG. 6, cooperates with the shutter housing 14 and the base housing section 12 to define an ambient light excluding exposure chamber surrounding the exposure optical path 94, 96. The second aspect relates to its design and structure for movement between its erected and folded positions. The bellows has been designed such that it integrates into the camera's folding scheme so that it may be folded into a flat storage configuration without conflict with other movable camera components. For clarity of description the bellows 98 is shown, separately, in a fully erect configuration in FIG. 8 and in a fully folded configuration in FIG. 9 in the same configuration that it assumes in FIGS. 6 and 7, respectively. Portions of the wall 100 of the bellows 98 are confined between the mirror carrier 76 and the viewing mirror 74. Therefore, movement of the mirror carrier 76 between its fully erect and folded positions causes the bellows 98 to be moved between its fully erect and folded positions. In the erect operative condition of the camera 10 the combination of the base housing section 12, the shutter housing 14 and the cover 16 form a fairly rigid triangular structure which prevents inadvertent movement of the viewing mirror carrier 76 by the fingers of a camera operator and also provides a limited degree of protection from damage to the bellows 98.

The base housing section 12, the shutter housing 14 and the viewing mirror carrier 76 components of the camera 10 are interconnected by a linkage system for coordinating unobstructed movement of these components between their erected and folded positions. The linkage system comprises a first or lower erecting link 102, a second or upper erecting link 104 and a third or shutter link 106. Both lower and upper erecting links 102 and 104 have proximate and distal ends. In this the preferred embodiment of the present invention, the proximate end of the lower erecting link 102 is rotatably attached to the camera 10 at the revolute pivot joint 56. The proximate end of the upper erecting link 104 is rotatably attached to the viewing mirror carrier 76 at a revolute pivot joint 108. The distal end of the lower erecting link 102 and the distal end of the upper erecting link 106 rotatably attached to one another at a revolute joint 110. In addition, one end of the shutter link 106 is rotatably attached to the upper end of the shutter housing 14, as depicted in FIG. 6, at a revolute pivot joint 111. Another end of the shutter link 106 is rotatably attached to the upper erecting link 106 at a revolute joint 112, intermediate the ends thereof. The six-bar erecting system of the present invention, therefore, comprises the three links 102, 104 and 106 together with the base housing section 12, the shutter housing 14 and the viewing mirror carrier 76.

Figure 10:
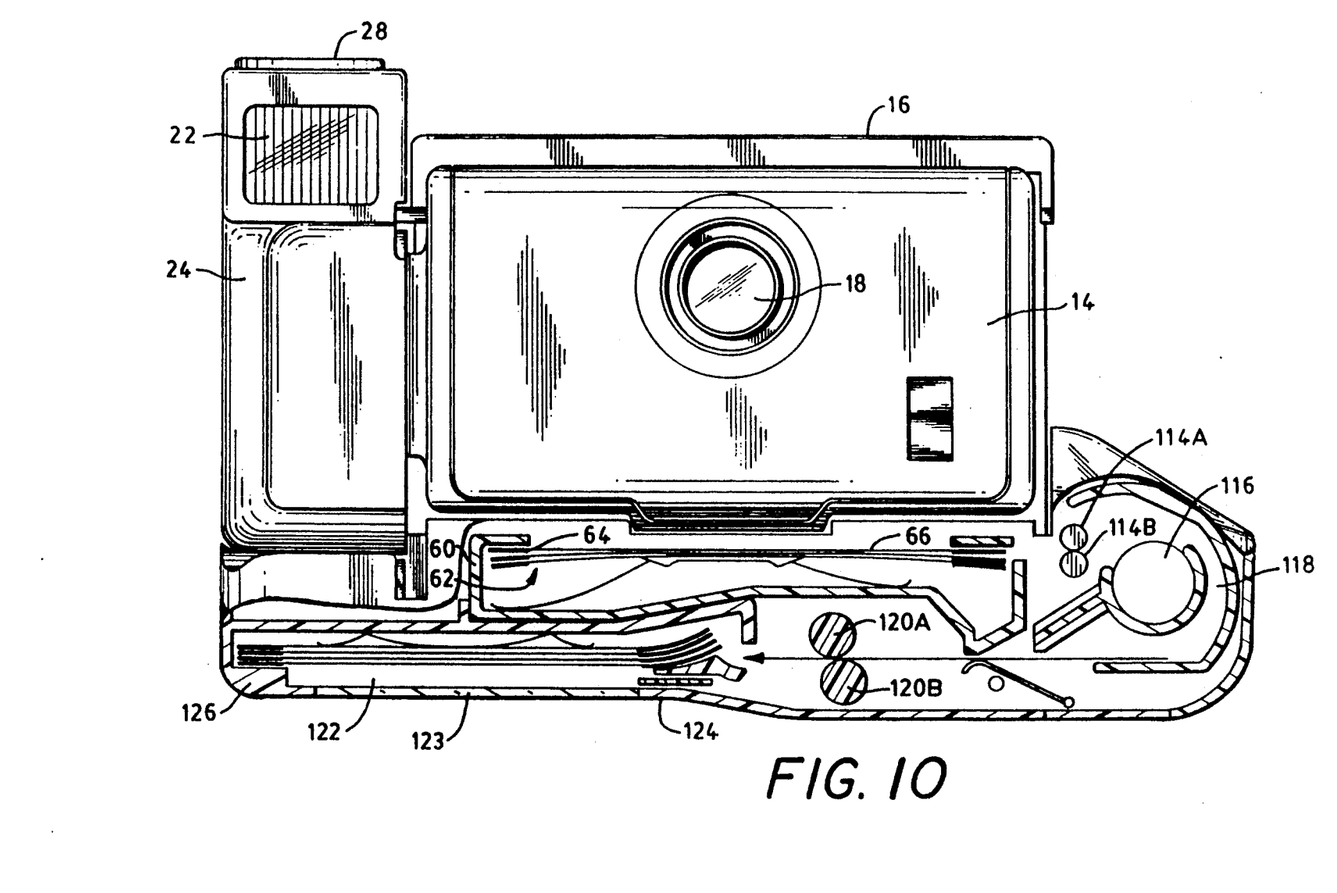
FIG. 10 is a front elevational view of the camera having the bottom portion thereof partly cut away to show certain components of the film transport and storage system thereof.

As noted above, the base housing section 12 encloses several functional components of the camera 10. FIG. 10 is a front elevational view of the camera 10 wherein the housing section 12 portion thereof has been cut away in order to reveal some of these functional components. As previously mentioned and as additionally shown in FIG. 10, the base housing section 12 includes means for supporting the film cassette 60 which encloses the plurality of self-developing film units 62 so that the fowardmost one 64 thereof is located at the film plane 66 of the folding camera 10. A flat VDC battery (not shown) which supplies all of the electrical power required to operate the camera 10, is also enclosed within the cassette 60.

After exposure, the film unit 64 is advanced into the bite of a pair of transport rollers 114A, 114B, by a film advancing mechanism or pick (not shown) that extends into the cassette 60 and engages a trailing end of the exposed film unit 64. The pick is driven by a DC motor 116 through a gear train (not shown) located within the base housing section 12. The transport rollers 114A, 114B, in turn, advance the exposed film unit 64 into a direction-reversing chute 118 and then into the bite of a pair of pressure-applying spread rollers 120A, 120B. The rollers 120A, 120B are also driven by the DC motor 116 and a gear train (not shown) that is also located within the base housing section 12.

The rollers 120A, 120B apply a compressive pressure to the film unit 64 as it is advanced therebetween for rupturing a pod at the leading end of the film unit and releasing therefrom an opaque liquid processing composition which is distributed between predetermined layers of the film unit to initiate a well-known development and diffusion transfer process. The spread rollers 120A, 120B and another advancing mechanism or pick (not shown) fully advance the developing film unit 64 into a storage chamber 122 within the housing section 12 for temporary storage therein. The developing film unit 64 is viewable through a window 123 in a bottom wall 124 of the housing section 12. That portion of the bottom wall 124 in which the window 123 is located is, in part, an access door which must be opened and closed in order to replace the film cassette 60. The developed film unit 64 may be removed from the storage chamber 122 through an access door 126 at one end of the housing section 12. The just-described camera components within the housing section 12 for supporting the film units 62, supplied in the cassette 60, at the film plane 66 of the folding camera 10 for exposure, and for processing and ejecting the film unit therefrom following exposure are all well-known in the prior art and need not be described further herein to understand the present invention. Representative examples of such components suitable for use in the folding camera 10 are disclosed in commonly-assigned U.S. Pat. Nos. 3,71879; 3,967,304; 4,047,192; and 4,051,492, all of which are incorporated herein by reference.

OPERATION

The six-bar, camera-component erecting system of the present invention functions in the following manner. The folding camera 10 is assumed to be in its fully folded or collapsed condition as shown in FIG. 1 with the cover member 16 maintained in its latched condition by the latching device included within the flash tube housing 24, as shown in FIG. 3. It is further assumed that the folded camera 10 is being held in the left hand of a camera operator with the viewing window 123 at the bottom of the base housing section 12 oriented generally parallel to the ground.

The erecting sequence of the folded camera 10 is initiated by the camera operator by grasping the flash tube housing 24 with the fingers of the right hand and then depressing the cover release bottom 28 located at the free end thereof, with the right thumb, to thereby unlatch the cover 16. The camera operator then rotates the flash tube housing 24 toward a vertical or upright orientation. As the flash tube housing 24 is rotated toward the upright position, the shutter housing 14, which is in a fixed relationship with respect thereto, also moves toward a vertical or upright position. The forces associated with the rotational movement of the shutter housing 14 are coupled to the viewing mirror carrier 76 and the viewing mirror 74 mounted thereon through the erecting links 102, 104 and 106. The force associated with the rotational movement of the shutter housing 14 is coupled to the upper erecting link 104 through the shutter link 106 causing the upper erecting link 104 to rotate in a clockwise direction, as viewed in FIGS. 6 or 7, about the pivot joints 108, 110, and 112. In addition, this clockwise rotation of the upper erecting link 104 causes the lower erecting link 102, rotatably coupled thereto, to rotate in a counter clockwise direction about the pivot joints 56 and 110 located at the opposite ends thereof. As the lower erecting link 102 and the upper erecting link 104 rotate in this manner the viewing mirror carrier 76, which is rotatably coupled to the upper erecting link 104 at the pivot joint 108, is rotated about the pivot joint 78 from its storage position as shown in FIG. 7 toward its fully erect or operative position as shown in FIG. 6.

Figure 8:
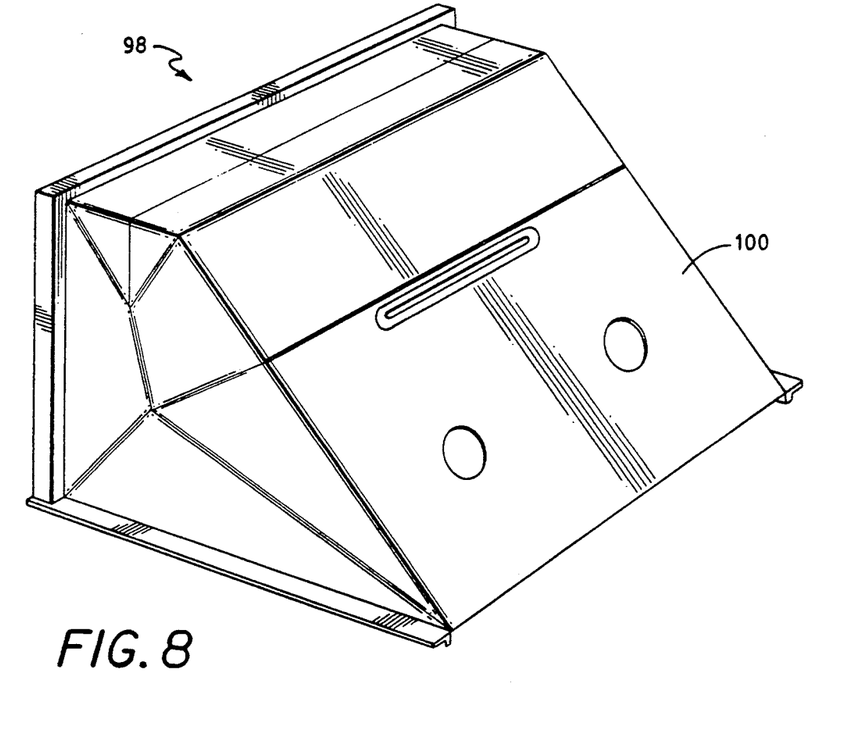
FIG. 8 is a perspective view of a folding, light-excluding bellows forming a part of the camera as shown in FIG. 6 showing the bellows in its erected operative position.
Figure 9:
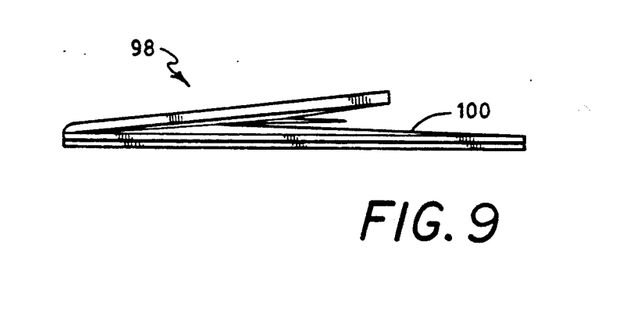
FIG. 9 is a side elevational view of the folding light-excluding bellows forming a part of the camera as shown in FIG. 7, showing the bellows in its folded inoperative position.

As noted above, portions of the wall 100 (FIG. 8) of the bellows 98 are confined or trapped between the viewing mirror 74 and the viewing mirror carrier 76. As the viewing mirror is moved toward its erect position by the erecting system of the present invention, the bellows 98 is moved from its storage position as shown in FIG. 9 to its erect position as shown in FIG. 8. When the viewing mirror carrier is fully erected, the axes of rotation of the pivot joints 56, 108, 110 and 112 of the upper and/or lower erecting links 102 and 104 are preferably in a coplanar relation with respect to one another. Placing the pivot joints 56, 108 and 110 in a coplanar relation with respect to one another insures that the viewing mirror 74 will be in its proper viewing position when the viewing mirror carrier 76 is in its fully erect position. The arrangement of the erecting links 102, 104 and 106 is such that these links provide sufficient mechanical resistance for the maintenance of the shutter housing 14 and the viewing mirror carrier 76 in their fully erect positions when the camera 10 is in its erect or operative condition.

With the folding camera 10 in its erect condition the camera operator may frame a scene to be photographed through the viewfinder optics which function in the previously described manner. After framing is complete the camera operator depresses a shutter button 128 to initiate an exposure cycle. When the shutter button 128 (FIG. 1) is depressed, the taking mirror 68 is moved, by conventional means, from a position overlying the film plane 66 where it precludes the passage of light thereto, to an image-forming or taking position 68'. After the taking mirror has moved to its taking position, the exposure control system actuates the shutter mechanism 73 to generate an exposure interval and thereby allow image-bearing light rays formed by the objective lens 70 to be transmitted along the paths 94 and 96 to the film unit 64 located at the film plane 66. At the completion of the exposure interval the taking mirror 68 is returned, by conventional means, to its light-blocking position overlying the film plane 66. The film transport system moves the exposed film unit 64 into the bite of the processing rollers 120A, 120B and then into the storage chamber 122 for temporary storage therein in the previously described manner.

If no further pictures are to be taken, the erecting system is actuated in a reverse manner to place the camera 10 in its folded or storage condition. With the camera 10 in the same position as it was before being placed in its erected position, a camera operator grasps the flash tube housing 24 with the fingers of the right hand and applies a force thereto in order to cause said housing 24 to rotate backward towards the rear thereof. When the mechanical resistance offered by the erecting links 102, 104 and 106 has been overcome, the force associated with flash tube housing 24 movement is coupled to the upper erecting link 104 through the shutter link 106. As viewed in FIG. 6, this force causes the upper erecting link 104 to rotate in a counterclockwise direction about the revolute pivot joints 108, 110 and 112. This, in turn, causes the lower erecting link 102 to rotate in a clockwise direction about the pivot joints 56 and 110. The continued movement of the upper erecting link 104 and the lower erecting link 102 in this manner causes the viewing mirror carrier 76 and the viewing mirror 74 mounted thereon to rotate about the pivot joint 78 toward the film plane 66. As the viewing mirror 74 and the viewing mirror carrier 76 continue to move in this manner the bellows 98, which has a wall portion 100 confined therebetween, is folded from the erect configuration as shwon in FIG. 8 to the storage configuration as shown in FIG. 9 in a storage location between the viewing mirror 74 and the taking mirror 68. As the viewing mirror carrier 76 is rotated into its storage position, the shutter housing 14 is rotated about the pivot joint 56 to a position where it overlies the mirror carrier 76. As the shutter housing 14 is moved into its storage position in this manner, the cover 16, which is spring force biased toward the base housing 12, pivots about an axis which is parallel to and displaced from the axis of rotation of the pivot joint 78. The cover 16 rotates until the edge 42 thereof (FIG. 5) engages the cam surface 44 of the finger 30 of the latch rod 26. At this point the camera operator presses down on the cover 16 until there is sufficient cover edge 42 to cam surface 44 induced displacement of the latch finger 30 out of the path of the moving cover 16. The finger 30 then slides along the side of the cover as it is further depressed, until it becomes aligned with and springs into the opening 46 therein, in a cover-latching relation.

From the foregoing description of the invention it will be apparent to those skilled in the art that various improvement and modifications can be made in it without departing from its true scope. The embodiments described herein are merely illustrative and should not be viewed as the only embodiments that might encompass the invention.

What is claimed:

1. A compact folding camera comprising:
   means for defining a film plane;
   a first housing section including means for supporting a film unit at said film plane;
   a second housing section mounting an objective lens, said second housing section being pivotally attached to said first housing section for movement between an operative erect position and an inoperative folded position overlying said film plane;

a mirror assembly, including a mirror, pivotally attached to said first housing section for movement of said mirror between an operative erect position and an inoperative folded position wherein said mirror overlies said film plane; and an erecting system for coordinating the movement of said second housing section and said mirror between their said erect and folded positions comprising a first link and a second link with each of said links having a distal end and a proximal end and with each of said links being pivotally attached to one another at their said distal ends, with a proximal end of said first link being pivotally attached to said first housing section and with a proximal end of said second link being pivotally attached to said mirror assembly, and a third link having an end thereof pivotally attached to said second housing section and another end pivotally attached to said second link intermediate of its said distal and proximal ends, whereby said erecting system coordinates the movement of said second housing member and said mirror assembly such that they are precluded from physically interfering with one another when manually actuated between their said erect and folded positions.

2. The compact folding camera of claim 1 wherein said erecting system is configured to effect movement of said mirror and said second housing section in a predetermined sequence.

3. The compact folding camera of claim 1 wherein said second housing section and said mirror assembly are intercoupled by said erecting system such that the manual movement of said second housing section between its said operative erect position and its said inoperative folded position moves the mirror between a corresponding operative erect position and an inoperative folded position.

4. The compact folding camera of claim 1 wherein said proximal end of said first link is pivotally attached to said first housing section at the same point that said second housing section is pivotally attached to said first housing section such that said first link and said second housing section pivot about the same axis of rotation when said second housing section is actuated between its said erect and folded positions.

5. The compact folding camera of claim 1 wherein said mirror is mounted on a mirror carrier and the said proximal end of said second link is pivotally attached to said mirror carrier.

6. The compact folding camera of claim 1 wherein the axes of rotation at the points of attachment of each of the pivotally attached proximal and distal ends of said first and second links are in coplanar relation with respect to one another when said second housing section and said mirror are in their respective erect operative positions.

7. The compact folding camera of claim 6 wherein the axis of rotation at the point of attachment of said third link to said second link is in coplanar relation with respect to the said axes of rotation of said second link.

8. The compact folding camera of claim 1 further comprising a foldable, light-excluding bellows connected to at least said first and second housing sections for movement between an erect operative position, and a folded storage position wherein said second housing section is placed in its said inoperative folded position and said bellows assumes a generally flat configuration with at least a portion thereof interposed between said mirror and said second housing section when the latter are in their respective inoperative folded positions.

9. The compact folding camera of claim 8 further comprising:

a cover member pivotally coupled to said first housing section for rotational movement between an erect position wherein said cover provides sufficient clearance to allow for said second housing, mirror assembly and bellows to assume their respective erected positions and a folded storage position wherein said cover member overlies said first housing section in a covering relation to said second housing section, mirror assembly and bellows located in their said respective storage positions;

a flash tube housing member for supporting an electronic flash tube, said flash tube housing member being mounted in a fixed position with respect to said second housing section for movement therewith; and a latch mechanism mounted within said flash tube housing, said latch mechanism including a latch member movable between a retracted position within said flash housing and an extended position projecting through an opening therein, said latch member being manually movable by a camera operator between said retracted position where it allows for the movement of said cover member between its said erect and folded positions, and said extended position where it engages said cover member and maintains it in its said storage position overlying said first housing section.

10. A compact folding camera comprising:

a first housing section including means for defining a film plane;

a second housing section mounting an objective lens, said second housing section being pivotally attached to said first housing section for movement between an erect operative position and a folded inoperative position overlying said film plane;

a flash tube housing member for supporting an electronic flash tube, said flash tube housing member being mounted in a fixed position with respect to said second housing section for movement therewith;

latch means, actuatable between a latch state and an unlatch state, for maintaining said second housing section in a fixed position with respect to said first housing section when said second housing section is in its said inoperative folded position overlying said film plane; and a manually actuatable latch release member projecting from a wall of said flash tube housing member and coupled to said latch means for actuating said latch means from its said latch state to its said unlatch state to thereby release said second housing section from its said fixed position with respect to said first housing section and thereby enable a camera operator to move said second housing section from its said folded inoperative position to its said erect operative position.

11. The camera of claim 10 wherein said latch release member projects from a top wall of said flash tube housing member.

12. The camera of claim 10 wherein said second housing section and said flash tube housing member are formed as a single housing unit.

* * * * *